United States Patent [19]
Goggins, Jr.

[11] 3,995,271
[45] Nov. 30, 1976

[54] ADAPTIVE CLUTTER CANCELLATION AND INTERFERENCE REJECTION SYSTEM FOR AMTI RADAR

[75] Inventor: William B. Goggins, Jr., Locke Mills, Utah

[73] Assignee: The United States of America as represented by the Secretary of the Air Force, Washington, D.C.

[22] Filed: Aug. 20, 1975

[21] Appl. No.: 606,624

[52] U.S. Cl. .................................. 343/7 A; 343/7.7
[51] Int. Cl.² ............................................ G01S 9/42
[58] Field of Search ............................. 343/7 A, 7.7

[56] References Cited
UNITED STATES PATENTS

| | | | |
|---|---|---|---|
| 3,725,922 | 4/1973 | Brennan et al. | 343/7 A |
| 3,727,220 | 4/1973 | Brennan et al. | 343/7 A |

Primary Examiner—T.H. Tubbesing
Attorney, Agent, or Firm—Joseph E. Rusz; Willard R. Matthews, Jr.

[57] ABSTRACT

In an AMTI radar having digital doppler processing, adaptive clutter and interference rejection is achieved by automatically adjusting antenna phase and amplitude weights to trim for uncalibrated errors and to put nulls in the antenna receive patterns in the direction of the source of interference or jamming signals. Antenna weights are initially chosen to achieve an optimum signal to clutter ratio. The radar receive signals are averaged over many range cells, filtered and summed by adaptive processor circuits. Feedback loops adjust the antenna weights to minimize the summed output. The circuits effect this by mechanizing the steepest descent algorithm.

1 Claim, 2 Drawing Figures

ADAPTIVE CLUTTER CANCELLATION AND INTERFERENCE REJECTION SYSTEM FOR AMTI RADAR

STATEMENT OF GOVERNMENT INTEREST

The invention described herein may be manufactured and used by or for the Government for governmental purposes without the payment of any royalty thereon.

BACKGROUND OF THE INVENTION

This invention relates to AMTI radar systems, and in particular to automatic means for improving the anti-jamming and interference and clutter rejection capabilities of such systems.

Radar systems of the type to which the adaptive clutter cancellation and interference rejection circuits of the invention can be applied are disclosed in U.S. Pat. Ser. No. 3,787,899, filed Nov. 7, 1972, by Carlyle J. Sletten et al., entitled AIRBORNE DIGITAL MOVING TARGET DETECTOR, and in U.S. Pat. Ser. No. 3,787,850, filed Nov. 7, 1972, by Carlyle J. Sletten et al., entitled AIRBORNE ANALOG MOVING TARGET DETECTOR.

There currently exists two basic problems that substantially reduce the effectiveness of these and other airborne radar systems. The primary problem is that of enemy jamming and interference from friendly as well as enemy RF sources that operate on the same frequency as the radar. The second problem is that of trimming phase and amplitude weights of the antenna element in order to overcome errors or show variations in these weights. These errors may be due to inaccurate calibrations, phase center measurements, or aircraft velocity measurements. The present invention is directed toward the solution of these particular problems with a concommitant improvement in the target-to-clutter ratio of the radar system.

SUMMARY OF THE INVENTION

The adaptive processor of the invention generates optimum antenna element weights by means of the mathematical theory known as the steepest descent algorithm. This is mechanized by means of a processing circuit for each receive channel of the radar that averages the digitized output of that channel's coherent receiver over many range cells. The output of the averaging means if filtered and fed directly to an input of a complex conjugate transform network, passed through a scaling unit, delayed, added with an initial clutter cancellation signal and fed to the other input of the complex multiplier. This signal is also multiplied by the corresponding channel input to the main radar doppler processor. The output of the complex multiplier is fed to a summing network that sums the outputs of the complex conjugate transform network of each processing circuit.

It is a principle object of the invention to provide a new and improved adaptive clutter and interference rejection system for an AMTI radar.

It is another object of the invention to provide new and improved means for overcoming the adverse effects of enemy jamming and other interference sources on airborne radar systems.

It is another object of the invention to provide means for automatically trimming antenna element phase and amplitude weights to compensate for errors and slow variations occuring therein.

These, together with other objects, features and advantages will become more readily apparent from the following detailed description taken in conjunction with the illustrated embodiment in the accompanying drawings.

DETAILED DESCRIPTION OF THE PREFERRED EMBODIMENT

Figure 1:
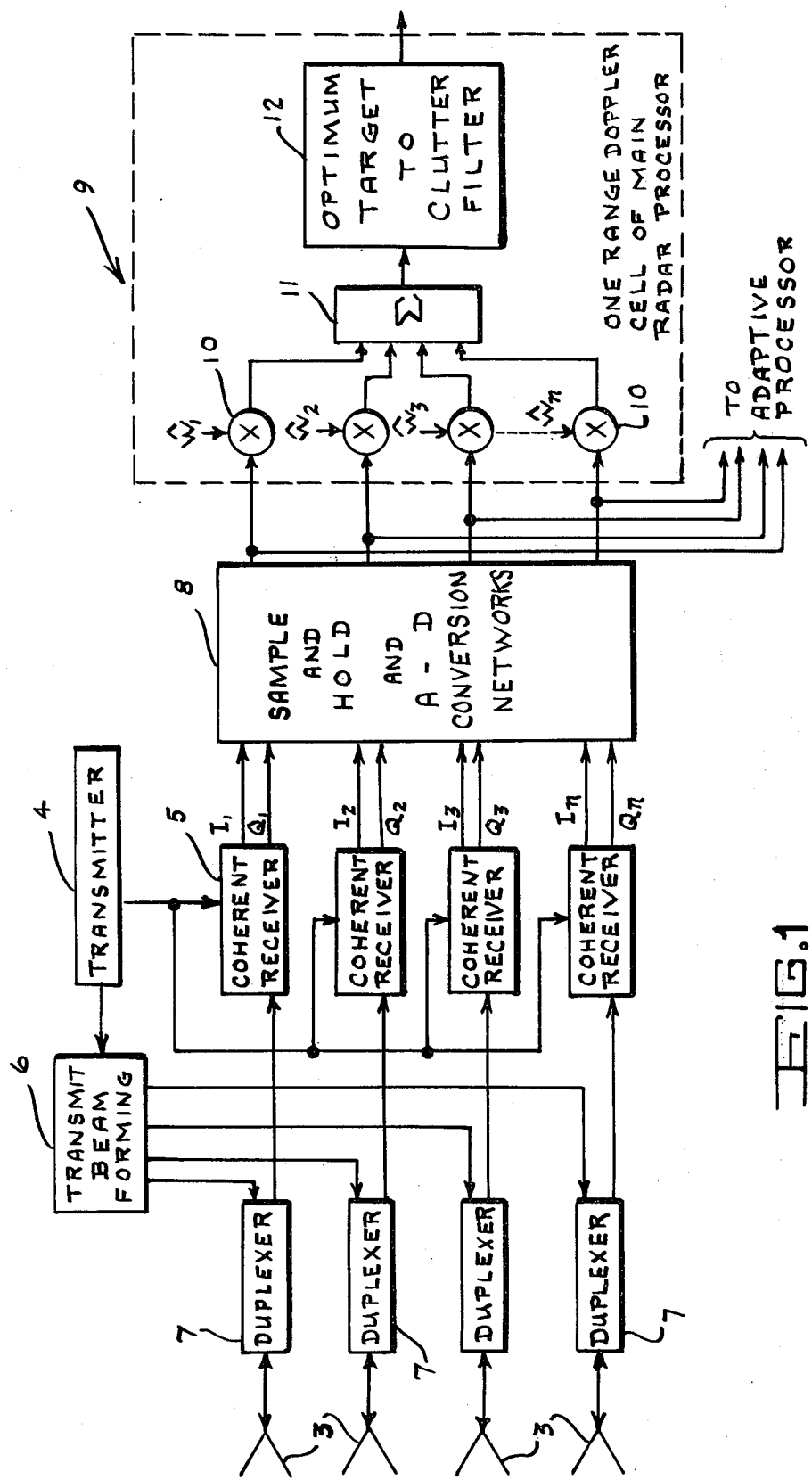
FIG. 1 is a partial block diagram of an AMTI clutter cancelling and jammer rejection system.

Having reference now to FIG. 1, a system with $n$ antenna elements 3 and digital doppler processing for one range-doppler cell is shown for simplicity. However, any number of antenna elements and many range doppler cells could be and would normally be used. In the block diagram of FIG. 1, the transmit radar pulse is generated in the transmitter 4. A sample of this transmit signal is also sent to the coherent receivers 5 for comparison with the received signal. The transmit signal goes to the transmit antenna beam forming network 6 where the transmit antenna pattern is formed. This generally consists of a group of power splitters and phase shifters to send the proper phase and amplitude signals to each antenna element in order to form the proper antenna beam. A commonly used network for this is a Butler matrix. The transmit signals pass through the duplexers 7 to the individual antenna elements 3 and are radiated. Radar energy received by the antennas 3 pass through the duplexers 7 to the coherent receivers 5 which consist of standard radar receivers whose outputs can be compared (multiplied) with the sample of the transmit signal. The outputs of the coherent receivers 5 are bipolar video. Both inphase (I) and quadrature components (Q) are generated and preserve the phase and amplitude relationships of the signal. In the digital version of the processing the I and Q components of the received signals go to sample and hold and A–D conversion networks 8 in which many range samples of $I_1$, $Q_1$ through $I_n$, $Q_n$ are taken and digitized. Each line coming out of the A–D converters represents both I and Q signals.

Figure 2:
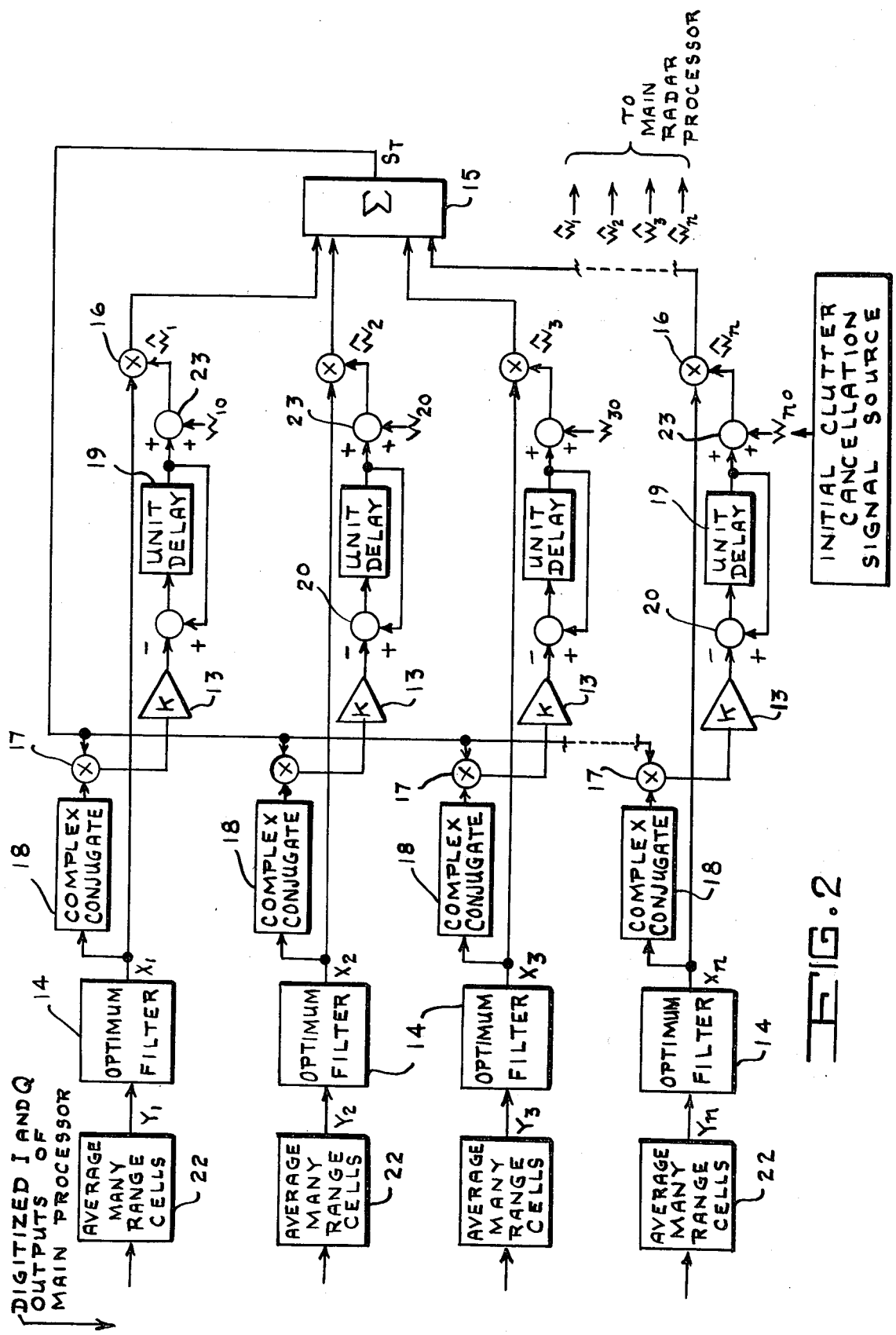
FIG. 2 is a block diagram of the anti-clutter trimming and jammer rejection portion of the system.

The digitized outputs go to two places, the adaptive processor of FIG. 2 and to the range doppler processor 9 of FIG. 1. In the range doppler processor 9 the inputs are multiplied by optimum antenna weights $\hat{W}_1$ through $\hat{W}_n$ by complex multipliers 10 and summed by summer means 11 in order to form an optimum antijam receive antenna beam. These signals are then sent to optimum target-to-clutter filter 12. Any doppler filter with a deep notch over the spectrum of the main beam cluter and a bandpass characteristic at the doppler frequency of the clutter may be used.

The nature of the receive antenna weights, $\hat{W}_1$ through $\hat{W}_n$, will be to form a receive antenna pattern (1) with deep nulls in the direction of any jamming or interference signals, (2) with a main beam pointing in a desired direction, and (3) with a deep broad null in the direction from which the clutter passed by the doppler velocity filter comes from. The clutter doppler frequency and clutter direction are related by the equation $$W_d = \frac{4\pi V_o}{\lambda} \sin \theta \qquad (1)$$

where $\theta$ is the angle, measured from broadside, of the clutter, $V_o$ is the aircraft velocity, and $\lambda$ is the radar wavelength.

The output of the doppler filter represents moving targets when it is above a certain threshold detection level.

The antenna weights can be the same for many range cells but must be different for each different digital doppler filter because of the relationship of Equation (1). This is because in order to detect targets with different radial velocities bandpass filters with different center frequencies will be needed. The antenna null angular sector corresponding to each of these bandpass filters is determined of course from Equation (1).

These optimum weights are calculated by the adaptive processor shown in FIG. 2. The overall action of this adaptive processor is to choose a set of antenna weights that will minimize its output. Thus the adaptive processor must be designed in such a way that it is sensitive only to clutter and to jammers and not to moving targets. One thing that distinguishes targets from clutter and jammers is that a target exists only in one range cell at a time whereas clutter is distributed over all range cells almost uniformly. Jammers of the type that try to blot out all the signals seen by the radar system are range independent and will be seen in all range cells. The digitized outputs from each antenna element are therefore averaged by range cell averaging means 22 over many range cells, first to cut down on the contribution of returns from moving targets since it is not desired that the adaptive processor try to steer a null in the direction of a moving target. Secondly, this averaging cuts down on the total amount of processing needed. For a high flying aircraft the azimuth angle of ground clutter producing a given doppler frequency varies substantially with range. For this reason all range cells from minimum to maximum range cannot be averaged together since the optimum weights are somewhat range dependent. However, weights may be averaged over the range interval where the corresponding angular sector on the ground is fairly constant.

The averaged outputs then go to the optimum target-to-clutter filter which for best results should have the same frequency response as the filter used at the output of the summer in main radar processor. The output of this filter will be the received output from each antenna element averaged over many range cells and spectrally modified by the doppler filter. Thus clutter from the angular sector corresponding to the antenna main beam will be attenuated by many dB while clutter from the angular sector corresponding to the doppler filter bandpass will be amplified by many dB. Referring now to the weights $W_{10}, \ldots W_{no}$, the case where the feedback loop is opened by disconnecting the output of the amplifier 13 is initially considered. In this case the $W_{10} = \hat{W}_i$. The $W_{10}$ are chosen to be the antenna array weights for the optimum AMTI antenna as described in U.S. Pat. Ser. No. 606,379 filed Aug. 20, 1975 by William B. Goggins, Jr., et al., entitled METHOD AND MEANS FOR PROVIDING OPTIMUM SIGNAL-TO-CLUTTER RATIO ANTENNA OPERATION IN AN AMTI RADAR. These weights are chosen to optimize the target-to-clutter ratio and in general will place a null in the angular sector corresponding to the clutter passed by the bandpass filter. Thus if there are no jammers or interference sources and if all phase shifts in the system and all external variables are accounted for and perfectly calibrated these weights would result in the maximum output from the summer.

The action of the feedback loops will be to adjust the weights $\hat{W}_1$ through $\hat{W}_n$ of the antenna elements in order to minimize the magnitude squared of the output of the summer. Since main beam clutter is attenuated by the filter the main beam formed by the $W_{10}$ will be reinforced. Since clutter from the angular sector corresponding to the bandpass of the doppler filter is peaked up, the action of the loops will be to adjust the antenna weights so as to reduce this clutter which will automatically tend to keep a deep null in the antenna over that angular sector.

In addition, if there are jammers or interference present and the level is high enough to get through the filtering, this will result in an increase in magnitude of the output of the summer. Recall that the action of the feedback loops will be such as to drive the weights $\hat{W}_1$ through $\hat{W}_n$ so as to minimize the squared output of the summer. This will thus cause nulls to be formed in the directions of the interference or jammers.

Let us now discuss the action of the feedback loops of FIG. 2. The outputs of the optimum filters 14, $X_i$, are multiplied by the $\hat{W}_i$ and summed to form an output, $$S_T = \sum_{i=1}^{n} \hat{W}_i X_i . \qquad (2)$$

Recall that objective of the feedback loops is to adjust the $\hat{W}_i$ so as to minimize $|S_T|$, the magnitude of the output of the radar system averaged over many range cells. Minimizing $|S_T|$ can be accomplished by minimizing $|S_T|^2$. The square of the output is a function of both $\hat{W}_i$ and $\hat{W}_i^*$. That is, $$|S_T|^2 = S_T \bar{S}_T = f(\hat{\bar{W}}, \hat{\bar{W}}*) \qquad (3)$$

where $$W = \begin{bmatrix} W_1 \\ W_2 \\ \cdot \\ \cdot \\ W_n \end{bmatrix} \qquad (4)$$

One way to minimize $|S_T|^2$ is to adjust the $\hat{W}_i$ using the steepest descent algorithm which is well known in the theory of mathematics. This indicates that to minimize $f(\hat{W}, \hat{W}*)$ $\hat{W}$ should be adjusted in steps so that $$\bar{\hat{W}}(j+1) = \bar{\hat{W}}(j) - k \, \hat{\nabla} f \, \bar{\hat{W}}(j), \bar{\hat{W}}*(j) \qquad (5)$$

where $\bar{\hat{W}}(j)$ denotes the value of the vector $\hat{\bar{W}}$ at the $j$th step. A minimum is reached when $\hat{\nabla} f$ is equal to the zero vector. The gradient vector is given by $$\hat{\nabla} f \, W(j), \bar{\hat{W}}*(j) = 2 \begin{bmatrix} \alpha f / \alpha W_1^* \\ \alpha f / \alpha W_2^* \\ \cdot \\ \cdot \\ \alpha f / \alpha W_n^* \end{bmatrix} . \qquad (6)$$

Calculation of $\nabla f$ shows that $$\begin{bmatrix} \frac{\alpha f}{\alpha W_1^*} \\ \frac{\alpha f}{\alpha W_2^*} \\ \vdots \\ \frac{\alpha f}{\alpha W_n^*} \end{bmatrix} = \begin{bmatrix} X_1 S_T \\ X_2 S_T \\ \vdots \\ X_n S_T \end{bmatrix} \quad (7)$$

Examination of the block diagram of FIG. 2 shows that it performs the steepest descent algorithm of Equation (5). The output, $S_T$, of the summing network is multiplied by complex multiplier 17 by $X_i^*$ which have been derived from the $X_i$ by passing through complex conjugate transform networks 18. The outputs of the multipliers then pass through amplifiers or scaling units 13 with a gain of $k$. If the output of the unit delay 19 is $W_i(j)$ then the output of the summing network 20 just in front of the $i$th unit delay is given by $$W_i(j+1) = W_i(j) - k\, X_i^* \, S_T. \quad (8)$$

Initial clutter cancellation signals $W_{10} \ldots W_{no}$ are summed with the outputs of delay units 19 by summing means 23. Comparison with Equations (5) and (7) shows that these loops perform the steepest descent algorithm and will adjust the antenna weights $W_i$ so as to minimize the magnitude of the output $S_T$. Also, since the weights $W_i$ are chosen a priori to minimize the magnitude of the output their effect will be to initialize the loops so that the action of the loops will be to trim for uncalibrated errors. More importantly, the loops will adapt to jammers by putting nulls in the antenna pattern in the direction of jammers.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In combination with an AMTI radar having multiple receive channels and a digital doppler processor an automatic interference and clutter cancelling means comprising
   an adaptive processor circuit connected to receive the digitized output of each receive channel, each processor circuit comprising a first series circuit arrangement of a range cell averaging means, filter means and a first complex multiplier and a second series circuit arrangement of a complex conjugate transform means, a second complex multiplier, a scaling unit, a first summing means, a unit delay means, the output of said unit delay means being fed back to said first summing means, and a second summing means, said complex conjugate transform means being connected to the output of said filter means and the output of said second summing means being connected to an input of said first complex multiplier,
   a third summing means having multiple inputs and an output, the output of the first complex multiplier of each adaptive processor circuit being connected to a discrete input thereof and the output of said third summing means being connected to an input of the second complex multiplier of each adaptive processor circuit,
   an initial clutter cancellation signal source having an output connected to an input of the second summing means of each adaptive processor circuit, and
   a third complex multiplier means connected to multiply the output of the second summing means of each adaptive processor circuit by a corresponding input of the radar digital doppler processor.

* * * * *